United States Patent
Marchionni et al.

(10) Patent No.: US 7,115,783 B2
(45) Date of Patent: Oct. 3, 2006

(54) PFPES HAVING AT LEAST AN ALKYLETHER END GROUP AND RESPECTIVE PREPARATION PROCESS

(75) Inventors: Giuseppe Marchionni, Milan (IT); Mario Visca, Alessandria (IT)

(73) Assignee: Solvay Solexis, S.p.A., Milan (IT)

( * ) Notice: Subject to any disclaimer, the term of this patent is extended or adjusted under 35 U.S.C. 154(b) by 0 days.

(21) Appl. No.: 11/181,787

(22) Filed: Jul. 15, 2005

(65) Prior Publication Data

US 2005/0250964 A1 Nov. 10, 2005

Related U.S. Application Data

(62) Division of application No. 10/179,977, filed on Jun. 26, 2002, now Pat. No. 6,982,173.

(30) Foreign Application Priority Data

Jun. 26, 2001 (IT) .......................... MI2001A1340

(51) Int. Cl.
*C07C 43/12* (2006.01)

(52) U.S. Cl. ..................................... 568/615

(58) Field of Classification Search ................ 568/615
See application file for complete search history.

(56) References Cited

U.S. PATENT DOCUMENTS

| | | | | |
|---|---|---|---|---|
| 3,770,792 A | 11/1973 | Sianesi et al. | ............... | 558/283 |
| 4,094,911 A | 6/1978 | Mitsch et al. | ................ | 568/615 |
| 5,202,480 A | 4/1993 | Bierschenk et al. | ........ | 562/582 |
| 5,237,108 A | 8/1993 | Marchionni et al. | ........ | 568/615 |
| 5,354,922 A | 10/1994 | Marchionni et al. | ........ | 568/560 |

FOREIGN PATENT DOCUMENTS

| | | |
|---|---|---|
| EP | 0 695 775 B1 | 2/1996 |
| EP | 1 074 584 A2 | 7/2001 |
| WO | WO 96/22129 A1 | 7/1996 |

OTHER PUBLICATIONS

Rogovik, V.M. et al., Fluoroaliphatic esters of fluorosulfonic acid. 2. Reaction of bis(fluorosulfato)perfluoroalkanes with cesium fluoride, Izvestiya Akademii Nauk SSSR, Seriya Khimicheskaya, 1990, (9), pp. 2057-2063.*

Henne et al., "Fluorinated Ethers," *J. Am. Chem. Soc.* 72, 4378-4380, 1950.

Zheng-Yu et al., "Potassium 3-oxa-omega-fluorosulfonylperfluoropentataoate ($FO_2SCHF_2CF_2OCF_2CO_2K$), a low temperature trifluoromethylating agent alpha-carbon-oxygen bond fragmentation," *J. Fluorine Chem* 78(2), 177-181, 1996.

Marchionni et al., "Hydrofluoropolyethers," *J. Fluorine Chem.* 95(1-2), 41-50, 1999.

Murata et al., "Reactions of oxalyl fluoride with electrophiles," *J. Fluorine Chem.* 113(1), 97-100, 2002.

* cited by examiner

Primary Examiner—Rosalynd Keys
(74) Attorney, Agent, or Firm—Arent Fox PLLC

(57) ABSTRACT

Perfluoropolyethers having structural formula $$R_1O\text{—}(CF_2O)_n\text{—}(CF_2CF_2O)_m R_2 \qquad (I)$$

wherein:
$R_1$ is —$CH_3$ or —$C_2H_5$; $R_2$ is equal to $R_1$ or —$CF_2H$
n is integer from 1 to 100; m is an integer from 1 to 100 or, when $R_2$ is —$CF_2H$, in can also be 0; the oxyfluoro-alkylene units —($CF_2CF_2O$)— and —($CF_2O$)— are statistically distributed along the polymer chain.

3 Claims, No Drawings

PFPES HAVING AT LEAST AN ALKYLETHER END GROUP AND RESPECTIVE PREPARATION PROCESS

CROSS REFERENCE TO RELATED APPLICATIONS

This is a divisional of U.S. patent application Ser. No. 10/179,977 filed Jun. 26, 2002, now U.S. Pat. No. 6,982,173 the contents of which are hereby incorporated in their entirety by reference.

The present invention relates to perfluoropolyethers (PFPE) having at least one alkylether end group and to the respective preparation process.

One of the methods for preparing perfluoropolyethers is the polymerization of tetrafluoroethylene (TFE) at low temperature, generally between −30° C. and −100° C., with oxygen in the presence of UV radiations or of radical initiators such for example $F_2$, $CF_3OF$, in inert solvent. From said reaction a peroxidic perfluoropolyether is obtained formed by sequences of oxyperfluoroalkylene units —$CF_2CF_2O$—, —$CF_2O$—, which contain peroxidic groups —$CF_2CF_2O$—O—, —$CF_2O$—O— in variable amounts. Said peroxidic compound is subsequently reduced by physical techniques as thermal or photochemical treatment or chemical techniques as for example reduction with $H_2$ in the presence of catalysts based on noble metals (Pt, Pd). The reduction breaks the peroxidic perfluoropolyether bonds and gives perfluoropolyethers having a lower molecular weight with —COF end groups. See for example U.S. Pat. No. 5,354,922.

One of the problems arising in carrying out said method is the need to determine the content of peroxidic bonds (PO) present in the PFPE to be reduced. The amount of peroxidic bonds varies depending on the polymerization reaction conditions. The peroxide content of the peroxidic PFPE has a remarkable importance since it controls the functionality degree of the final perfluoropolyethers, besides its determination allows to evaluate that it does not exceed 5% (expressed as active oxygen weight with respect to 100 g of compound) since amounts higher than said value compromise the polymerization plant due to safety for possible explosion. It is therefore necessary to continuously monitor the PO content during the polymerization reaction.

Furthermore it is essential to determine the presence even in traces of the peroxidic bonds contained in the final perfluoropolyethers obtained from the reduction of the peroxidic PFPEs, since in their use, for example as lubricants, said content must be lower than 1 ppm, in particular when they are used in the presence of metals to avoid the degradation of the perfluoropolyether itself.

Among the various analytical methods developed for determining the PO content in perfluoropolyether chains, a method comprising the titration of iodine generated by oxidation of an iodide from the peroxide contained in the PFPE, carried out in the presence of a specific solvent which results compatible with the peroxidic PFPE, has acquired a prevailing use, for economic reasons, of simplicity and sensitivity. A particularly suitable solvent commonly used in said method is 1,1,2-trichloro trifluoro ethane (CFC 113). See for example U.S. Pat. No. 3,770,792.

However due to the Montreal Conference, chlorofluorocarbons, as CFC 113, have been banned.

The need was therefore felt to find a solvent having the same characteristics and properties of CFC 113 to be used in the aforesaid analytical determination.

It has been unexpectedly and surprisingly found that it is possible to use in the iodometric determination of the PFPE oxidizing power (PO), solvents formed by perfluoropolyethers having one end group —$CH_3$ or —$C_2H_5$ and the other selected from —$CH_3$, —$C_2H_5$, —$CF_2H$.

An object of the present invention are therefore perfluoropolyethers having the following structural formula $$R_1O-(CF_2O)_n-(CF_2CF_2O)_mR_2 \qquad (I)$$

wherein:
$R_1$ is —$CH_3$ or —$C_2H_5$;
$R_2$ is equal to $R_1$ or —$CF_2H$;
n is 0 or an integer from 1 to 100;
m is an integer from 1 to 100 or, when $R_2$ is —$CF_2H$, m can also be 0;
the oxyfluoroalkylene units —$(CF_2CF_2O)$— and —$(CF_2O)$— are statistically distributed along the polymer chain.

Among the perfluoropolyethers of formula (I) those having the following structures, or their mixtures, are preferred:

$H_3CO-(CF_2O)_n-(CF_2CF_2O)_mCH_3$
$H_5C_2O-(CF_2O)_n-(CF_2CF_2O)_mC_2H_5$
$H_3CO-(CF_2O)_n-(CF_2CF_2O)_mCF_2H$
$H_5C_2O-(CF_2O)_n-(CF_2CF_2O)_mCF_2H$ wherein m, n are selected so as to have a number average molecular weight lower than 5,000.

Examples of compounds which are included in said structures are the following:

$CH_3OCF_2CF_2OCH_3$
$CH_3OCF_2CF_2OCF_2CF_2OCH_3$
$CH_3OCF_2CF_2OCF_2OCF_2CF_2OCH_3$
$CH_3O(CF_2CF_2O)_3CH_3$
$CH_3OCF_2CF_2O(CF_2O)_2CF_2CF_2OCH_3$
$CH_3OCF_2CF_2OCF_2OCF_2CF_2OCF_2CF_2OCH_3$
$CH_3O(CF_2CF_2O)_4CH_3$
$CH_3OCF_2CF_2OCF_2O(CF_2CF_2O)_2CF_2CF_2OCH_3$
$CH_3OCF_2CF_2OCF_2CF_2OCF_2OCF_2OCF_2CF_2OCF_2CF_2OCH_3$
$CH_3O(CF_2CF_2O)_5CH_3$
$C_2H_5OCF_2CF_2OC_2H_5$
$C_2H_5OCF_2CF_2OCF_2CF_2OC_2H_5$
$C_2H_5OCF_2CF_2OCF_2OCF_2CF_2OC_2H_5$
$C_2H_5O(CF_2CF_2O)_3C_2H_5$
$C_2H_5OCF_2CF_2O(CF_2O)_2CF_2CF_2OC_2H_5$
$C_2H_5OCF_2CF_2OCF_2OCF_2CF_2OCF_2CF_2OC_2H_5$
$C_2H_5O(CF_2CF_2O)_4C_2H_5$
$C_2H_5OCF_2CF_2OCF_2O(CF_2CF_2O)_2CF_2CF_2OC_2H_5$
$C_2H_5OCF_2CF_2OCF_2CF_2OCF_2OCF_2OCF_2CF_2OCF_2CF_2OC_2H_5$
$C_2H_5O(CF_2CF_2O)_5C_2H_5$
$CH_3OCF_2H$
$CH_3OCF_2CF_2OCF_2H$
$CH_3OCF_2CF_2OCF_2OCF_2H$
$CH_3O(CF_2CF_2O)_2CF_2H$
$CH_3OCF_2CF_2O(CF_2O)_2CF_2H$
$CH_3OCF_2CF_2OCF_2OCF_2CF_2OCF_2H$
$CH_3OCF_2CF_2OCF_2CF_2OCF_2OCF_2H$
$CH_3O(CF_2CF_2O)_3CF_2H$
$CH_3OCF_2CF_2OCF_2O(CF_2CF_2O)_2CF_2H$
$CH_3OCF_2CF_2OCF_2CF_2OCF_2OCF_2OCF_2H$
$CH_3O(CF_2CF_2O)_3CF_2OCF_2H$

CH$_3$O(CF$_2$CF$_2$O)$_4$CF$_2$H
C$_2$H$_5$OCF$_2$H
C$_2$H$_5$OCF$_2$CF$_2$OCF$_2$H
C$_2$H$_5$OCF$_2$CF$_2$OCF$_2$OCF$_2$H
C$_2$H$_5$O(CF$_2$CF$_2$O)$_2$CF$_2$H
C$_2$H$_5$OCF$_2$CF$_2$O(CF$_2$O)$_2$CF$_2$H
C$_2$H$_5$OCF$_2$CF$_2$OCF$_2$OCF$_2$CF$_2$OCF$_2$H
C$_2$H$_5$O(CF$_2$CF$_2$O)$_2$CF$_2$OCF$_2$H
C$_2$H$_5$O(CF$_2$CF$_2$O)$_3$CF$_2$H
C$_2$H$_5$OCF$_2$CF$_2$OCF$_2$O(CF$_2$CF$_2$O)$_2$CF$_2$H
C$_2$H$_5$OCF$_2$CF$_2$OCF$_2$CF$_2$OCF$_2$OCF$_2$CF$_2$OCF$_2$H
C$_2$H$_5$O(CF$_2$CF$_2$O)$_3$CF$_2$OCF$_2$H
C$_2$H$_5$O(CF$_2$CF$_2$O)$_4$CF$_2$H

As said the perfluoropolyethers of formula (I), optionally in admixture with each other, can unexpectedly be used as solvents in substitution of CFC 113 in the iodometric determination of the PFPE oxidizing power (PO). Examples of PFPE which can be analyzed for the PO determination are those having the repeating units —CFX$_1$O— and —CF$_2$CFX$_1$O—, wherein X$_1$ is —F or —CF$_3$.

The perfluoropolyethers of formula (I) are characterized by being environmental friendly since they have an ozone impact equal to zero (ODP=0) and a very low potential greenhouse effect (GWP).

The Applicant has found that the perfluoropolyethers of the invention can be used also for the further following applications. The perfluoropolyethers of formula (I), optionally in admixture with each other, due to their high solvent power for the perfluoropolyether lubricants, in particular those containing repeating units —CFX$_1$O— and, —CF$_2$CFX$_1$O—, wherein X$_1$ is —F or —CF$_3$, are particularly suitable to be used as solvents in the acidity determination of said lubricants. For this purpose the perfluoroether oil is dissolved in the compounds of formula (I), added with an aqueous solution of NaOH and the base excess is potentiometrically titrated with hydrochloric acid.

The perfluoropolyethers of formula (I) can also be used as solvents in the determination of arsenic traces and heavy metals in case present in perfluoropolyether oils, in particular those used in cosmetic preparations for which the substantial absence of said metals is required, since they can cause dermatic allergies. In particular they can be used as solvents in the ICP-OES (Inductively Coupled Plasma-Optical Emission Spectrometry) method.

A further application of the perfluoropolyethers of formula (I) is their use as solvents of perfluoropolyether oils having high molecular weight employed in lubrication of computer hard disks.

Due to their high thermal capacity, their UV transparence and their chemical inertia the compounds of formula (I) can also be used as refrigerants which absorb the infrared radiation and remove the heat emitted by UV lamps used in photochemical reactions carried out at low temperatures, from –30° C. to –100° C., thus allowing to maintain the low temperatures used in the reaction reactor. An example of said photochemical reaction is the tetrafluoroethylene (TFE) and/or hexafluoropropene (HFP) polymerization with oxygen in the presence of UV radiations.

The compounds of formula (I) of the present invention in view of their chemical, physical properties and of a low impact on the environment, find also application in the following fields:

heat transfer, e.g. in pharmaceutical equipments as lyophilizers refrigerants in secondary loop refrigerants as lubricants (fluids and greases)

solvents and/or co-solvents, optionally in the presence of specific additives, for cleaning and/or drying components in precision mechanics, in jeweller's ware/silverware, in optics working fluids in the Thermal Shock tests to which electronic components are subjected, they also are employed in other tests used in electronics such for example in Gross Leak test, in Burn-in test, in Environmental test screening (ESS) and in the hermeticity closure test of a sealed hollow.

A further object of the present invention is the process for the preparation of the compounds of formula (I).

It is known from patent application WO 96/22129 the preparation of perfluorinated compounds containing in the polymer chain oxygen heteroatoms and having alkylether end groups, by alkylation with suitable alkylating agents, in particular dimethylsulphate, of the corresponding alkaline alcoholates in their turn obtained by treatment with an alkaline metal fluoride, for example KF, in an aprotic polar solvent, of the corresponding perfluorinated compounds having —COF end groups. The dimethylsulphate use owing to its toxicity and carcinogenic activity, raises sanitary and ecological problems. Besides it is hardly recoverable from the reaction. Furthermore it is to be used at alkylation temperatures lower than 20° C., wherein also the undesired formation of a gel is obtained, this due to the reaction between the acylfluorides and the formed alcoholate, with consequent increase of the reaction viscosity and respective remarkable reduction of the alkylation rate.

The Applicant has found that it is possible to use the above method in the preparation of the perfluoropolyethers of formula (I) by using particular alkylating agents characterized by:

not carcinogenic activity usable at high temperatures and therefore able to avoid the gel formation easy to separate from the reaction system so that they can be regenerated and reused in the process.

The Applicant has indeed unexpectedly and surprisingly found that alkylating agents having the above mentioned properties are formed by alkylsulphites or polymers having as repeating units the perfluoropolyoxyalkylene sulphonic esters.

A further object of the present invention is a process for the preparation of perfluoropolyethers having structural formula (I) comprising the following steps:

a) reaction between:

a perfluoropolyether having —COF end groups of formula $$FOCCF_2O-(CF_2O)_n-(CF_2CF_2O)_m-CF_2COF \quad (II)$$

wherein n, m are integers from 0 to 100, or a compound of formula $$FOC-COF \quad (II\ bis);$$

with an alkaline metal fluoride (M), in an aprotic polar solvent, at temperatures between 40° C. and 70° C., to yield the corresponding alcoholate having —CF$_2$OM end groups;

b) addition to the reaction compound obtained in step a) of an alkylating agent:

an alkylsulphite of formula $$(R_1O)_2SO \quad (III)$$

wherein R$_1$ is —CH$_3$ or —C$_2$H$_5$, or:

a polymer having as repeating units perfluorooxyalkylene sulphonic esters, of formula (IV)

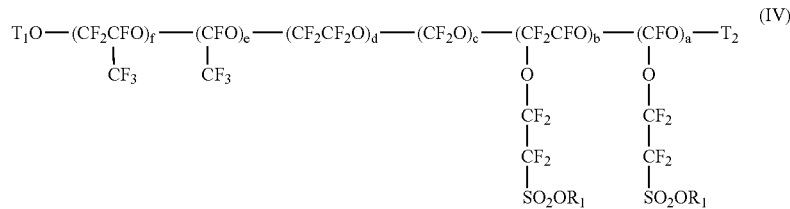

wherein $R_1$ has the above meaning; the coefficients a, b, c, d, e, f are integers, including zero, with at least a or b different from 0, so that their sum is such that the number average molecular weight be in the range 1,000–50,000; $T_1$, $T_2$ equal to or different from each other, are selected from —$CF_2H$,

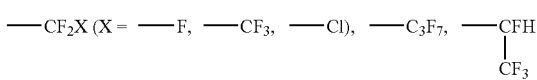

keeping the reaction mixture under stirring, at a temperature in the range 110° C.–200° C., preferably 130° C.–160° C., when the alkylsulphite (III) is used, and at temperatures in the range 0° C.–60° C., preferably 20° C.–40° C., when perfluoropolyoxyalkylene sulphonic esters (IV) are used;

c) the reaction mixture obtained in step b) is salified with a base, preferably KOH or NaOH, then it is distilled in steam flow obtaining an aqueous residue and a distillate from which an organic phase formed by the compound of formula (I) wherein $R_1$ and $R_2$ are methyl or ethyl, is separated;

d) the distillation residue of step c) is acidified with a HCl solution, distilled under vacuum, in a range from 70° C. to 170° C., separating from the distillate an organic phase formed by a compound of formula (I) wherein $R_1$ is —$CH_3$ or —$C_2H_5$ and $R_2$ is —$CF_2COOH$, then salification with KOH or NaOH, subsequently decarboxylated by known methods obtaining the compound of formula (I) wherein $R_1$ is —$CH_3$ or —$C_2H_5$ and $R_2$ is —$CF_2H$.

As alkaline metal fluoride the potassium fluoride (KF) is preferred.

As aprotic polar solvent, the diethylenglycol dimethylether (diglyme) is preferred.

Compared to the alkylation processes with dimethylsulphate of the prior art:
- the use of alkyl sulphites of formula (III), not considered carcinogenic, allow to carry out the reaction at temperatures higher than 100° C., with the advantage that at said temperatures the formation of undesired gel is reduced and an increase of the reaction rate is obtained
- the use of the perfluoropolyoxyalkylene sulphonic ester of formula (IV) has the advantage that it is possible to recover it from the reaction mixture as alkaline salt and subsequently to regenerate it by reaction with methanol or ethanol and $SOCl_2$.

The Applicant has furthermore found that in the above mentioned uses, besides the compounds of formula (I), also the perfluoropolyethers can be used, formed by oxyfluoroalkylene units —($CF_2CF_2O$)— and —($CF_2O$)— statistically distributed along the polymer chain having both end groups formed by the $OCF_2H$ group described for example in EP 695,775, in particular the compound sold by the Applicant as GALDEN™ ZT results suitable.

Some Examples follow for illustrative and not limitative purposes of the present invention.

EXAMPLES

Example 1

In a 1000 ml reactor equipped with mechanical stirring and fluxing system with nitrogen, 70 g of anhydrous KF and 600 ml of diglyme are charged. By maintaining the reaction temperature at 20° C., 212 g of a perfluoropolyether having fluoroacyl end groups of formula (II)

$$FOC—CF_2O—(CF_2O)_n—(CF_2CF_2O)_mCF_2—COF \qquad (II)$$

are slowly added, wherein m/n=2.6 and the number average molecular weight is 580.

Said perfluoropolyether has been prepared by photooxidation of tetrafluoroethylene with oxygen and subsequent reduction of the obtained peroxide.

The reaction mixture is heated to 60° C. and maintained under stirring for 2 hours.

After having cooled the mixture to 20° C., 130 g of dimethylsulphite are added.

When the dimethylsulphite addition is over, the reaction mass is kept under stirring for one hour at room temperature.

Always under stirring the temperature is brought to 150° C. and it is maintained for two hours.

At the end, it is cooled to 20° C., and the reaction mixture is neutralized with an aqueous solution of KOH at 10%.

The reaction mixture is subjected to distillation in steam flow obtaining an aqueous phase and an organic phase formed by a neutral fluorinated compound.

The fluorinated organic phase is separated, washed with water and anhydrified with calcium chloride.

39 g (yield 18%) of a compound which has been characterized by NMR $^{19}F$, $^1H$ and IR analyses, are obtained.

The compound has the following structure:

$$CH_3OCF_2CF_2O(CF_2CF_2O)_m(CF_2O)_nCF_2CF_2OCH_3 \qquad (IIa)$$

with a m/n ratio=2.6 and a number average molecular weight of 576.

The distillation residue is acidified with 1,000 g of HCl at 20%.

A fluorinated organic phase is separated which is washed with other 500 g of HCl at 20% and then distilled. 89 g (yield 41%) are recovered of a fraction which distils between 70° C. and 120° C. at 0.5 mbar, characterized by NMR $^{19}F$ and $^1H$ analyses, having the following structure:

$$CH_3OCF_2CF_2O(CF_2CF_2O)_m(CF_2O)_nCF_2COOH \qquad (IIb)$$

wherein m/n=2.6 and the number average molecular weight is 585.

The residue (78 g) is mainly formed by a perfluoropolyether having the two carboxylic end groups of formula $$HOOC-CF_2O(CF_2CF_2O)_m(CF_2O)_nCF_2COOH \quad (IIc)$$

wherein m/n=2.6.

Decarboxylation 50 g of the acid monofunctional compound of formula (IIb) are neutralized with 100 g of KOH at 5%. The homogeneous solution is charged into a 500 ml AISI autoclave, stirred and heated at 160° C. for 8 hours. At the end the mixture is discharged in a separatory funnel.

39 g of an organic phase are separated, which after washing with water and subsequent anhydrification with calcium chloride, has been characterized by NMR $^{19}$F, $^1$H analyses as a compound having the following structure:

$$CH_3OCF_2CF_2O)_m(CF_2O)_nCF_2H \quad (IId)$$

having m/n=3.1 and a number average molecular weight of 571. The compound (IIa) having the structure $$CH_2OCF_2CF_2O)_m(CF_2O)_nCF_2CF_2OCH_3$$

shows the following properties:

| | |
|---|---|
| Tg measured by DSC: | −125.6° C. |
| Dielectric constant: | 5.3 at 1 kHz |
| Boiling point: | 155.5° C. |
| Refractive index: | 1.2935 at 20° C. | and density and viscosity variations in function of the temperature as reported in the following Table:

| Temperature (° C.) | Density (g/cc) | Viscosity (cSt) |
|---|---|---|
| 40 | 1.5815 | 1.37 |
| 20 | 1.6227 | 2.04 |
| −10 | 1.6845 | 4.70 |

Example 2 a) Preparation of the Alkylating Agent Methyl Ester of the Polysulphonic PFPE 300 g of polysulphonic PFPE having structure (A) were prepared:

$$T_3O(CF(OCF_2CF_2SO_2F)O)_a(CF_2CF(OCF_2CF_2SO_2F)O)_b(CF_2O)_cT_2 \quad (A)$$

wherein $T_3$, $T_2$ is
for 11% molar —$CF_3$,
for 82% molar —$CF_2COF$,
for 7% molar —$CF_2Cl$, wherein, considering the statistical distribution of the oxyfluoroalkylene units in the polymer chain, it results, on an average value, a=10.6, b=10.1, c=13.2 and a number average molecular weight of 6670 and an equivalent weight equal to 309, by photooxidation of $CF_2=CFOCF_2CF_2SO_2F$ with oxygen and subsequent reduction of the obtained peroxide.

100 g of said compound are treated at 80° C. with 250 g of an aqueous solution of KOH at 20%. The obtained homogeneous solution is neutralized with HCl at 10% and then concentrated under vacuum at the temperature of 160° C. obtaining 170 g of a solid residue.

The residue is dispersed in 300 ml of methanol to which 60 g of $SOCl_2$ are added.

The solution is filtered to remove the inorganic salts present as bottom body and the filtrate is distilled under vacuum (0.3 mbar) at the temperature of 130° C.

103 g of a compound are obtained, which characterized by NMR $^{19}$F, $^1$H and IR analyses, results to have the following structure (B):

$$T_1O(CF(OCF_2CF_2SO_2OCH_3)O)_a(CF_2CF(OCF_2CF_2SO_2OCH_3)O)_b(CF_2O)_cT_2 \quad (B)$$

wherein $T_1$, $T_2$ represent on an average value,
—$CF_3$ for 11% molar,
—$CF_2H$ for 82% molar,
—$CF_2Cl$ for 7% molar, wherein on an average value a=10.6, b=10.1, c=13.2 and the number average molecular weight is 6,920.

b) Methylation of the Diacylfluoride

In a 1,000 ml reactor equipped with mechanical stirring and fluxing system with nitrogen, 23 g of anhydrous KF and 500 ml of diglyme $CH_3O(CH_2CH_2O)_2CH_3$ are charged.

By keeping the temperature at 20° C., 90 g of diacylfluoride of formula (II) of Example 1 are slowly added.

The obtained mixture is maintained under stirring at 60° C. for 2 hours.

At the end of the two hours the mixture is cooled to −10° C. and 100 g of methyl ester of the polysulphonic PFPE of formula (B) prepared at point a) are slowly added.

When said addition is over, the reactor temperature is brought to 40° C. and the mixture is left under stirring for 8 hours. The reaction mixture is then distilled under vacuum (0.3 mbar) up to a temperature of 150° C. obtaining a residue and a distillate.

To the residue, comprising the potassium salt of polysulphonic PFPE, 300 ml of methanol and subsequently 60 g of $SOCl_2$ are added. The solution is filtered to separate the inorganic salts and the filtrate is distilled under vacuum (0.3 mbar) up to the temperature of 130° C.

The so obtained methyl ester of the polysulphonic PFPE is usable for a subsequent methylation.

The distillate is neutralized with an aqueous solution of KOH at 10%. The obtained solution is distilled in steam flow obtaining an aqueous phase and an organic phase formed by a neutral fluorinated compound.

The fluorinated organic phase is separated, washed with water and anhydrified with calcium chloride. 75 g are obtained of a compound which characterized by NMR $^{19}$F, $^1$H and IR analyses, results to have the following structure:

$$CH_3OCF_2CF_2O(CF_2CF_2O)_m(CF_2O)_nCF_2CF_2OCH_3$$

wherein m/n=2.5 and the number average molecular weight is 601.

The distillation residue has been acidified with 500 g of a HCl solution at 20%.

A fluorinated organic phase is separated which is washed with other 250 g of a HCl solution at 20% and then distilled. 9.6 g of a fraction which distils between 70° C. and 120° C. at 0.5 mbar are recovered.

The distilled fraction, characterized by NMR $^{19}$F and $^1$H analyses, results to be the compound:

$$CH_3OCF_2CF_2O(CF_2CF_2O)_m(CF_2O)_nCF_2COOH$$

wherein m/n=2.7 and the number average molecular weight is 581.

9

EXAMPLE 3 a) Preparation of the Alkylating Agent Ethyl Ester of the Polysulphonic PFPE 98 g of compound (A) described in Example 2 are treated at 80° C. with 250 g of an aqueous solution of KOH at 20%. The obtained homogeneous solution is neutralized with a HCl solution at 10% and then concentrated under vacuum at the temperature of 160° C. obtaining 164 g of a solid residue.

The residue is dispersed in 400 ml of ethanol to which 60 g of $SOCl_2$ are added. The solution is filtered to eliminate the present inorganic salts and the filtrate is distilled under vacuum at the temperature of 130° C.

106 g of distillate are obtained, which, characterized by NMR $^{19}F$, $^1H$ and IR analyses results to have the following structure (C):

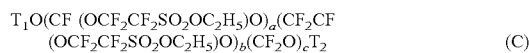

$$T_1O(CF(OCF_2CF_2SO_2OC_2H_5)O)_a(CF_2CF(OCF_2CF_2SO_2OC_2H_5)O)_b(CF_2O)_cT_2 \quad (C)$$

wherein $T_1$, $T_2$ represent on an average value
—$CF_3$ for 11% molar,
—$CF_2H$ for 82% molar,
—$CF_2Cl$ for 7% molar,
wherein on an average value a=10.6, b=10.1, c=13.2 and with a number average molecular weight of 7,210.

b) Ethylation of the Diacylfluoride

In a 1000 ml reactor equipped with mechanical stirring and fluxing system with nitrogen, 25 g of anhydrous KF and 500 ml of diglyme $CH_3O(CH_2CH_2O)_2CH_3$ are charged.

By keeping the temperature at 20° C., 85 g of diacylfluoride of formula (II) of Example 1 are slowly added.

The obtained mixture is maintained under stirring at 60° C. for 2 hours. At the end of the two hours the mixture is cooled to −10° C. and 101 g of ethyl ester of the polysulphonic PFPE of formula (C) prepared at point a) are slowly added.

When said addition is over, the reactor temperature is brought to 40° C. and the mixture is left under stirring for 8 hours. The reaction mixture is then distilled under vacuum (0.3 mbar) up to a temperature of 150° C. obtaining a residue and a distillate.

The residue is treated according to the above procedure of Example 2 obtaining the ethyl ester of the polysulphonic PFPE which results usable for a subsequent alkylation.

The distillate is neutralized with an aqueous solution of KOH at 10%. The obtained solution is distilled in steam flow obtaining an aqueous phase and an organic phase formed by a neutral fluorinated compound.

The fluorinated organic phase is separated, washed with water and anhydrified with calcium chloride. 79 g are obtained of a compound which characterized by NMR $^{19}F$, $^1H$ and IR analyses, results to have the following structure:

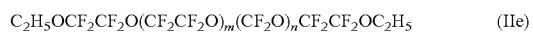

$$C_2H_5OCF_2CF_2O(CF_2CF_2O)_m(CF_2O)_nCF_2CF_2OC_2H_5 \quad (IIe)$$

wherein m/n=2.5 and the number average molecular weight is 665.

The distillation residue has been acidified with 500 g of a HCl solution at 20%. A fluorinated organic phase is separated which is washed with other 250 g of a HCl solution at 20% and then distilled. 11.5 g of a fraction which distils between 70° C. and 120° C. at 0.5 mbar, are recovered.

The distilled fraction, characterized by NMR $^{19}F$ and $^1H$ analyses, results to be the compound:

$$C_2H_5OCF_2CF_2O(CF_2CF_2O)_m(CF_2O)_nCF_2COOH \quad (IIf)$$

wherein m/n=2.6 and the number average molecular weight is 620.

EXAMPLE 4

Analysis of the Oxidizing Power (PO) of a Commercial Perfluoropolyether Fluid

In a beaker adaptable to the DL40 titrator head by Mettler, 20 g of a perfluoropolyether commercially known as Fomblin® M60 produced by AUSIMONT S.p.A. are weighed with the precision of 0.001 g.

20 ml of solvent formed by the compound (IIa) described in Example 1 and 1 ml of acetic acid are added by pipette. The beaker is connected to the titration head already equipped with stirrer, platinum electrode and reference electrode, burette caps for the NaI and thiosulphate solutions.

30 ml of NaI solution in isopropanol at 5% by weight are added and it is put under strong stirring for 15 minutes. The titration environment must be strictly closed and the beaker sheltered from light.

10 ml of distilled water are added by pipette and one titres with the sodium thiosulphate 0,01N solution. A control test without the perfluoropolyether to be analyzed and a comparative test using CFC 113 as solvent are parallelly carried out.

The oxidizing power PO (expressed as mg of active oxygen for 1000 g of compound) is given by the formula:

$$PO=(V-B)*0,01*8*1000/P$$

wherein:
V=ml of titrant used to titre the sample
B=ml of titrant used to titre the control test
P=weight in grams of the sample.

The results of the analysis carried out using the two solvents are reported in Table I.

TABLE I

| Solvent | P (g) | V (ml) | B (ml) | PO (ppm) |
|---|---|---|---|---|
| CFC 113 | 20.1005 | 0.15 | 0.1 | <1 |
| Compound (IIa) | 20.1523 | 0.2 | 0.1 | <1 |

EXAMPLE 5

Analysis of a Perfluoropolyether Containing Traces of Peroxide

According to the procedure described in Example 4 a perfluoropolyether sample of the productive line Fomblin Z® is analyzed, coming from the thermal treatment section at 230° C. for 6 hours of the peroxidic perfluoropolyethers of the industrial plant. The results are reported in Table II.

TABLE II

| Solvent | P (g) | V (ml) | B (ml) | PO (ppm) |
|---|---|---|---|---|
| CFC 113 | 20.2037 | 5.39 | 0.1 | 21 |
| Compound (IIa) | 20.3040 | 5.83 | 0.1 | 23 |

On the basis of the obtained results, the compound is not suitable to be sold since it has a PO higher than 1 ppm and therefore it is subjected to a further thermal treatment at 240°

C. for 4 hours at the end of which it results to have a PO lower than 1 ppm analyzed according to Example 4 using both CFC 113 and the compound (IIa).

EXAMPLE 6

Analysis of the PO of a Peroxidic Perfluoropolyether

A sample of peroxidic perfluoropolyether is drawn at the outlet of the photooxidation reactor with oxygen of tetrafluoroethylene.

It, after complete evaporation of the reaction solvent, has been analyzed according to the procedure described in Example 4 except that 2 g of sample and a sodium thiosulphate 0,1N have ben used as titrant.

Considering the high content of PO it is not necessary to carry out the control test and the formula to determine the PO becomes:

$$PO = V*0,1*8*1000/P$$

wherein
V=ml of titrant used to titre the sample
P=weight in grams of the sample.

The results of the analysis carried out using the two solvents are reported in Table I.

The results are reported in Table III.

TABLE III

| Solvent | P (g) | V (ml) | PO (ppm) |
|---|---|---|---|
| CFC 113 | 0.2805 | 14.9 | 42,250 |
| Compound (IIa) | 0.1834 | 9.8 | 42,750 |

What is claimed is:

1. Perfluoropolyethers having structural formula $$R_1O-(CF_2O)_n-(CF_2CF_2O)_mR_2 \quad (I)$$ wherein:

$R_1$ is $-CH_3$ or $-C_2H_5$;
$R_2$ is equal to $R_1$ or $-CF_2H$;
n is an integer from 1 to 100;
m is an integer from 1 to 100;
the oxyfluoroalkylene units $-(CF_2CF_2O)-$ and $-(CF_2O)-$ are statistically distributed along the polymer chain.

2. Perfluoropolyethers according to claim 1, having a structure selected from the group consisting of:
$H_3CO-(CF_2O)_n-(CF_2CF_2O)_mCH_3$;
$H_5C_2O-(CF_2O)_n-(CF_2CF_2O)_mC_2H_5$;
$H_3CO-(CF_2O)_n-(CF_2CF_2O)_mCF_2H$; and
$H_5C_2O-(CF_2O)_n-(CF_2CF_2O)_mCF_2H$;
wherein m, and n are selected so as to have a number average molecular weight lower than 5,000, or mixtures thereof.

3. Perfluoropolyethers according to claim 1, selected from the group consisting of:
$CH_3OCF_2CF_2OCF_2OCF_2CF_2OCH_3$
$CH_3OCF_2CF_2O(CF_2O)_2CF_2CF_2OCH_3$
$CH_3OCF_2CF_2OCF_2OCF_2CF_2OCF_2CF_2OCH_3$
$CH_3OCF_2CF_2OCF_2O(CF_2CF_2O)_2CF_2CF_2OCH_3$
$CH_3OCF_2CF_2OCF_2CF_2OCF_2OCF_2CF_2OCF_2CF_2OCH_3$
$C_2H_5OCF_2CF_2OCF_2OCF_2CF_2OC_2H_5$
$C_2H_5OCF_2CF_2O(CF_2O)_2CF_2CF_2OC_2H_5$
$C_2H_5OCF_2CF_2OCF_2OCF_2CF_2OCF_2CF_2OC_2H_5$
$C_2H_5OCF_2CF_2OCF_2O(CF_2CF_2O)_2CF_2CF_2OC_2H_5$
$C_2H_5OCF_2CF_2OCF_2OCF_2CF_2OCF_2CF_2OCF_2CF_2OC_2H_5$
$CH_3OCF_2CF_2OCF_2OCF_2H$
$CH_3OCF_2CF_2O(CF_2O)_2CF_2H$
$CH_3OCF_2CF_2OCF_2OCF_2CF_2OCF_2H$
$CH_3OCF_2CF_2OCF_2CF_2OCF_2OCF_2H$
$CH_3OCF_2CF_2OCF_2O(CF_2CF_2O)_2CF_2H$
$CH_3OCF_2CF_2OCF_2CF_2OCF_2OCF_2CF_2OCF_2H$
$CH_3O(CF_2CF_2O)_3CF_2OCF_2H$
$C_2H_5OCF_2CF_2OCF_2OCF_2H$
$C_2H_5OCF_2CF_2O(CF_2O)_2CF_2H$
$C_2H_5OCF_2CF_2OCF_2OCF_2CF_2OCF_2H$
$C_2H_5O(CF_2CF_2O)_2CF_2OCF_2H$
$C_2H_5OCF_2CF_2OCF_2O(CF_2CF_2O)_2CF_2H$
$C_2H_5OCF_2CF_2OCF_2CF_2OCF_2OCF_2CF_2OCF_2H$
$C_2H_5O(CF_2CF_2O)_3CF_2OCF_2H$ or mixtures thereof.

* * * * *